US008027798B2

(12) United States Patent
Johns et al.

(10) Patent No.: US 8,027,798 B2
(45) Date of Patent: Sep. 27, 2011

(54) DIGITAL THERMAL SENSOR TEST IMPLEMENTATION WITHOUT USING MAIN CORE VOLTAGE SUPPLY

(75) Inventors: Charles R. Johns, Austin, TX (US); Mack W. Riley, Austin, TX (US); David W. Shan, Austin, TX (US); Michael F. Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/937,134

(22) Filed: Nov. 8, 2007

(65) Prior Publication Data
US 2009/0125267 A1 May 14, 2009

(51) Int. Cl.
G01C 19/00 (2006.01)
G01K 3/00 (2006.01)
H02H 5/04 (2006.01)

(52) U.S. Cl. .......................... 702/104; 374/137; 361/103

(58) Field of Classification Search .................. 702/104, 702/57, 81, 99, 127, 130–133, 136, 60, 64–65, 702/84–85, 182–183, 189; 374/1, 100, 137, 374/E15.001; 361/93.8, 103; 438/54; 700/299; 713/300, 310, 320, 322
See application file for complete search history.

(56) References Cited

U.S. PATENT DOCUMENTS

| | | |
|---|---|---|
| 4,497,031 A | 1/1985 | Froehling et al. |
| 5,175,852 A | 12/1992 | Johnson et al. |
| 5,469,560 A | 11/1995 | Beglin |
| 5,590,061 A | 12/1996 | Hollowell, II et al. |
| 5,778,384 A | 7/1998 | Provino et al. |
| 5,953,536 A | 9/1999 | Nowlin, Jr. |
| 6,029,119 A | 2/2000 | Atkinson |
| 6,193,422 B1 | 2/2001 | Belt et al. |

(Continued)

FOREIGN PATENT DOCUMENTS

CN 1380738 11/2002

(Continued)

OTHER PUBLICATIONS

ADM1021, Analog Devices, Low cost Microprocessor System Temperature Monitor, 1998, pp. 1-12.
U.S. Appl. No. 11/425,453, Image File Wrapper printed Oct. 8, 2010, 3 pages.
U.S. Appl. No. 11/425,455, Image File Wrapper printed Oct. 8, 2010, 3 pages.
U.S. Appl. No. 11/425,459, Image File Wrapper printed Oct. 8, 2010, 2 pages.

(Continued)

*Primary Examiner* — Eliseo Ramos Feliciano
*Assistant Examiner* — Toan M Le
(74) *Attorney, Agent, or Firm* — Francis Lammes; Stephen J. Walder, Jr.; Matthew B. Talpis (57) ABSTRACT

A method and apparatus are provided for calibrating digital thermal sensors. A processor chip with a plurality of digital thermal sensors receives an analog voltage. A test circuit coupled to the processor chip receives a clock signal and a register coupled to the test circuit outputs a value on each clock cycle to a digital thermal sensor in the plurality of digital thermal sensors. The digital thermal sensor transitions an output state in response to the value of the register received in the digital thermal sensor equaling a temperature threshold of the digital thermal sensor. The value of the register at the point of transition is used to calibrate the digital thermal sensor. An incrementer increments the value of the register on each clock cycle in response to the value of the register received in the digital thermal sensor failing to equal the temperature threshold of the digital thermal sensor.

21 Claims, 5 Drawing Sheets

U.S. PATENT DOCUMENTS

| | | | |
|---|---|---|---|
| 6,393,374 B1 | 5/2002 | Rankin et al. | |
| 6,470,289 B1 | 10/2002 | Peters et al. | |
| 6,535,798 B1 | 3/2003 | Bhatia et al. | |
| 6,564,328 B1 | 5/2003 | Grochowski et al. | |
| 6,609,208 B1 | 8/2003 | Farkas et al. | |
| 6,630,754 B1 | 10/2003 | Pippin | |
| 6,654,894 B2 | 11/2003 | Kaminski et al. | |
| 6,662,136 B2* | 12/2003 | Lamb et al. | 702/132 |
| 6,760,649 B2 | 7/2004 | Cohen | |
| 6,776,817 B2 | 8/2004 | Lentz et al. | |
| 6,778,921 B2 | 8/2004 | Keane et al. | |
| 6,789,037 B2 | 9/2004 | Gunther et al. | |
| 6,804,632 B2 | 10/2004 | Orenstien et al. | |
| 6,889,330 B2 | 5/2005 | Chauvel et al. | |
| 6,901,521 B2 | 5/2005 | Chauvel et al. | |
| 6,908,227 B2 | 6/2005 | Rusu et al. | |
| 6,909,922 B2 | 6/2005 | Tymchenko | |
| 6,974,252 B2 | 12/2005 | Bowden et al. | |
| 6,975,047 B2 | 12/2005 | Pippin | |
| 6,980,918 B2 | 12/2005 | Gunther et al. | |
| 7,028,200 B2 | 4/2006 | Ma | |
| 7,043,405 B2 | 5/2006 | Orenstien et al. | |
| 7,050,959 B1 | 5/2006 | Pollard, II et al. | |
| 7,062,304 B2 | 6/2006 | Chauvel et al. | |
| 7,086,058 B2* | 8/2006 | Luick | 718/102 |
| 7,127,625 B2 | 10/2006 | Farkas et al. | |
| 7,149,645 B2 | 12/2006 | Mangrulkar et al. | |
| 7,158,911 B2 | 1/2007 | Gunther et al. | |
| 7,197,433 B2 | 3/2007 | Patel et al. | |
| 7,214,910 B2* | 5/2007 | Chen et al. | 219/494 |
| 7,228,508 B1 | 6/2007 | Pippin | |
| 7,263,457 B2 | 8/2007 | White et al. | |
| 7,263,567 B1 | 8/2007 | Subramaniyam et al. | |
| 7,275,012 B2 | 9/2007 | Hermerding, II et al. | |
| 7,287,173 B2 | 10/2007 | Hsieh | |
| 7,299,372 B2 | 11/2007 | Brown et al. | |
| 7,340,366 B2* | 3/2008 | Aas et al. | 702/130 |
| 7,360,102 B2 | 4/2008 | Inoue | |
| 7,370,242 B2 | 5/2008 | Chen et al. | |
| 7,376,532 B2 | 5/2008 | Johns et al. | |
| 7,383,144 B2* | 6/2008 | Lorenz | 702/99 |
| 7,400,945 B2 | 7/2008 | Radhakrishnan et al. | |
| 7,412,353 B2 | 8/2008 | Borkar et al. | |
| 7,447,920 B2 | 11/2008 | Sharma et al. | |
| 7,460,932 B2 | 12/2008 | Johns et al. | |
| 7,480,585 B2 | 1/2009 | Johns et al. | |
| 7,480,586 B2 | 1/2009 | Johns et al. | |
| 7,512,513 B2 | 3/2009 | Johns et al. | |
| 7,512,514 B2* | 3/2009 | Duarte et al. | 702/130 |
| 7,587,262 B1 | 9/2009 | Pippin | |
| 7,596,430 B2 | 9/2009 | Aguilar et al. | |
| 7,603,576 B2* | 10/2009 | Johns et al. | 713/322 |
| 7,681,053 B2 | 3/2010 | Johns et al. | |
| 7,721,128 B2 | 5/2010 | Johns et al. | |
| 2002/0065049 A1 | 5/2002 | Chauvel et al. | |
| 2002/0083354 A1 | 6/2002 | Adachi | |
| 2002/0104030 A1 | 8/2002 | Ahn | |
| 2003/0014587 A1 | 1/2003 | Bouvier et al. | |
| 2003/0097875 A1 | 5/2003 | Lentz et al. | |
| 2003/0110012 A1 | 6/2003 | Orenstien et al. | |
| 2003/0117759 A1 | 6/2003 | Cooper | |
| 2003/0126476 A1 | 7/2003 | Greene | |
| 2003/0158697 A1 | 8/2003 | Gold et al. | |
| 2003/0177107 A1 | 9/2003 | Brown et al. | |
| 2003/0212474 A1 | 11/2003 | Pippin | |
| 2003/0229662 A1 | 12/2003 | Luick | |
| 2004/0035851 A1 | 2/2004 | Antoniou et al. | |
| 2004/0047099 A1 | 3/2004 | Pippin | |
| 2004/0128101 A1 | 7/2004 | Hermerding, II | |
| 2004/0204899 A1 | 10/2004 | Gunther et al. | |
| 2004/0268159 A1 | 12/2004 | Aasheim et al. | |
| 2005/0055590 A1 | 3/2005 | Farkas et al. | |
| 2005/0216222 A1 | 9/2005 | Inoue | |
| 2005/0216775 A1 | 9/2005 | Inoue | |
| 2005/0228618 A1 | 10/2005 | Patel et al. | |
| 2005/0246558 A1 | 11/2005 | Ku | |
| 2005/0278520 A1 | 12/2005 | Hirai et al. | |
| 2006/0005083 A1 | 1/2006 | Genden et al. | |
| 2006/0041766 A1 | 2/2006 | Adachi | |
| 2006/0047808 A1 | 3/2006 | Sharma et al. | |
| 2006/0101289 A1 | 5/2006 | Dang et al. | |
| 2006/0161375 A1 | 7/2006 | Duberstein et al. | |
| 2006/0289862 A1 | 12/2006 | Yoshida et al. | |
| 2007/0055469 A1 | 3/2007 | Rotem et al. | |
| 2007/0067136 A1 | 3/2007 | Conroy et al. | |
| 2007/0074011 A1 | 3/2007 | Borkar et al. | |
| 2007/0106428 A1 | 5/2007 | Omizo et al. | |
| 2007/0121492 A1 | 5/2007 | Johns et al. | |
| 2007/0121698 A1 | 5/2007 | Johns et al. | |
| 2007/0121699 A1 | 5/2007 | Johns et al. | |
| 2007/0124101 A1* | 5/2007 | Aguilar et al. | 702/130 |
| 2007/0124104 A1 | 5/2007 | Johns et al. | |
| 2007/0124105 A1 | 5/2007 | Johns et al. | |
| 2007/0124355 A1 | 5/2007 | Johns et al. | |
| 2007/0124611 A1 | 5/2007 | Johns et al. | |
| 2007/0124622 A1 | 5/2007 | Johns et al. | |
| 2007/0156370 A1 | 7/2007 | White et al. | |
| 2007/0191993 A1 | 8/2007 | Wyatt | |
| 2007/0198134 A1 | 8/2007 | Adachi et al. | |
| 2008/0103634 A1 | 5/2008 | Santos et al. | |

FOREIGN PATENT DOCUMENTS

| | | |
|---|---|---|
| EP | 1182538 A2 | 2/2002 |
| EP | 1783608 A1 | 5/2007 |
| WO | WO-2005093564 A2 | 10/2005 |
| WO | WO-2005093569 A1 | 10/2005 |
| WO | WO-2005124550 A1 | 12/2005 |

OTHER PUBLICATIONS

U.S. Appl. No. 11/425,462, Image File Wrapper printed Oct. 11, 2010, 2 pages.

U.S. Appl. No. 11/425,472, Image File Wrapper printed Oct. 8, 2010, 3 pages.

U.S. Appl. No. 11/425,483, Image File Wrapper printed Oct. 8, 2010, 3 pages.

U.S. Appl. No. 11/425,492, Image File Wrapper printed Oct. 8, 2010, 3 pages.

U.S. Appl. No. 11/425,499, Image File Wrapper printed Oct. 8, 2010, 2 pages.

http://en.wikipedia.org/wiki/Central_processing_unit, retrieved Dec. 26, 2006, pp. 1-13.

http://en.wikipedia.org/wiki/Computer_graphics, retrieved Oct. 11, 2010, pp. 1-11.

http://www.m-w.com/dictionary/sense, retrieved Dec. 11, 2006, pp. 1-2.

Fukutain, Kazuhiko et al., "Design of Bulk Thermoelectric Modules for Integrated Circuit Thermal Management", IEEE Transactions on Components and Packaging Technologies, vol. 29, No. 4, Dec. 2006, pp. 750-757.

Lin, Sheng-Chih et al., "A Self-Consistent Substrate Thermal Profile Estimation Technique for Nanoscale ICs-Part 1: Electrothermal Couplings and Full Chip Package Thermal Model", IEEE Transactions on Electron Devices, Dec. 2007, pp. 3342-3350.

Pham, Dac C. et al., "Overview of the Architecture, Circuit Design, and Physical Implementation of a First-Generation Cell Processor", IEEE Journal of Solid-State Circuits, vol. 41, No. 1, Jan. 2006, pp. 179-196.

Smith, Matt, "Measuring temperatures on computer chips with speed and accuracy", Analog Dialogue 33-4, 1999 Analog Devices, pp. 1-5.

Viswanth, Ram et al., "Thermal Performance Challenges from Silicon to Systems", Technology and Manufacturing Group, Intel Corporation, Aug. 22, 2000, pp. 1-16.

Young, Jedediah et al., "Enabling Technologies for Integrated System-on-a-Package for the next generation Aerospace Applications", University of Arkansas Department of Mechanical Engineering, Aerospace Conference Proceedings, vol. 5, 2002, pp. 5-2177 thru 5-2184.

Yuan, Tsorng-Dih et al., "Thermal Management for High Performance Integrated Circuits with Non-Uniform Chip Power Considerations", IBM Research Division, IEEE 2001, pp. 95-101.

* cited by examiner

DIGITAL THERMAL SENSOR TEST IMPLEMENTATION WITHOUT USING MAIN CORE VOLTAGE SUPPLY

BACKGROUND

1. Technical Field

The present application relates generally to an improved data processing system and method. More specifically, the present application is directed to a digital thermal sensor test implementation that does not use main core voltage supply.

2. Description of Related Art

The first-generation heterogeneous Cell Broadband Engine™ (Cell BE) processor is a multi-core chip comprised of a 64-bit Power PC® processor core and eight single instruction multiple data (SIMD) synergistic processor cores, capable of massive floating point processing, optimized for compute-intensive workloads and broadband rich media applications. A high-speed memory controller and high-bandwidth bus interface are also integrated on-chip. Cell BE's breakthrough multi-core architecture and ultra high-speed communications capabilities deliver vastly improved, real-time response, in many cases ten times the performance of the latest PC processors. Cell BE is operating system neutral and supports multiple operating systems simultaneously. Applications for this type of processor range from a next generation of game systems with dramatically enhanced realism, to systems that form the hub for digital media and streaming content in the home, to systems used to develop and distribute digital content, and to systems to accelerate visualization and supercomputing applications.

Today's multi-core processors are frequently limited by thermal considerations. Typical solutions include cooling and power management. Cooling may be expensive and/or difficult to package. Power management is generally a coarse action, "throttling" much, if not all, of the processor in reaction to a thermal limit being reached. Other techniques such as thermal management help address these coarse actions by only throttling the units exceeding a given temperature. However, most thermal management techniques impact the real-time guarantees of an application. In order to guarantee the real-time nature of an application in the event of a thermal condition and the accurate throttling that may be required, calibration is usually required. Currently, both analog and core voltage supplies are required during the test and calibration process to power the digital thermal sensor and test logic. However, within the current calibration processes with core voltage supply enabled, the processor consumes a significant amount of power due to leakage current and, in turn, the self-heating due to leakage current elevates the internal processor temperature. This added variable makes the calibration process more difficult and also less accurate.

SUMMARY

The illustrative embodiments provide for test logic in an analog voltage domain in order to reduce or eliminate the need to enable core voltage supply and possibly encounter self-heating due to the leakage current used by the processor. Moving the test logic to the analog voltage domain provides advantages, such as eliminates the effect of self-heating during calibration, does not require the system to go through a power-on reset sequence to set up the core logic, provides a simpler test/calibration sequence, and requires less logic and a smaller footprint. In short, the illustrative embodiments improve calibration accuracy, reduce test time, reduce calibration complexity, and reduce area.

The illustrative embodiments provide for the calibration of digital thermal sensors. The illustrative embodiments receive an analog voltage in a processor chip with a plurality of digital thermal sensors. The illustrative embodiments provide a test circuit coupled to the processor chip that receives a clock signal. The illustrative embodiments output a value of a register that is coupled to the test circuit on each clock cycle to a digital thermal sensor in the plurality of digital thermal sensors. Responsive to the value of the register received in the digital thermal sensor equaling a temperature threshold of the digital thermal sensor, the illustrative embodiments transition an output state of the digital thermal sensor. The value of the register at the point of transition is used to calibrate the digital thermal sensor.

The illustrative embodiments also include an incrementer that increments the value of the register on each clock cycle from the clock signal in response to the value of the register received in the digital thermal sensor failing to equal the temperature threshold of the digital thermal sensor. The value of the register may be incremented by one on each clock cycle. Incrementing the value of the register on each clock cycle from the clock signal is performed in response to receiving a start signal indicating a second state.

The illustrative embodiments receive a start signal indicating a first state that initiates a test mode. Responsive to receiving the start signal indicating the first state, the illustrative embodiments hold the start signal in the first state for a predetermined number of clock cycles so that the value of the register sets to zero. The predetermined number of clock cycles is determined by a size of the register.

In the illustrative embodiments a delta value that indicates the calibration value of the digital thermal sensor is stored in a data structure in a thermal management control unit. The delta value indicates a difference between the value of the register at the point of transition and a manufacturer's test fixture temperature. The delta value is used to calibrate the temperatures sensed by the digital thermal sensor in a functional mode.

In the illustrative embodiments the processor chip is placed in a manufacturer's test fixture and is given time to stabilize to a test temperature of the manufacturer's test fixture. In the illustrative embodiments the digital thermal sensor is set to an initial thermal threshold. Also in the illustrative embodiments the calibration of the digital thermal sensor is performed without applying a core voltage to the processor chip.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
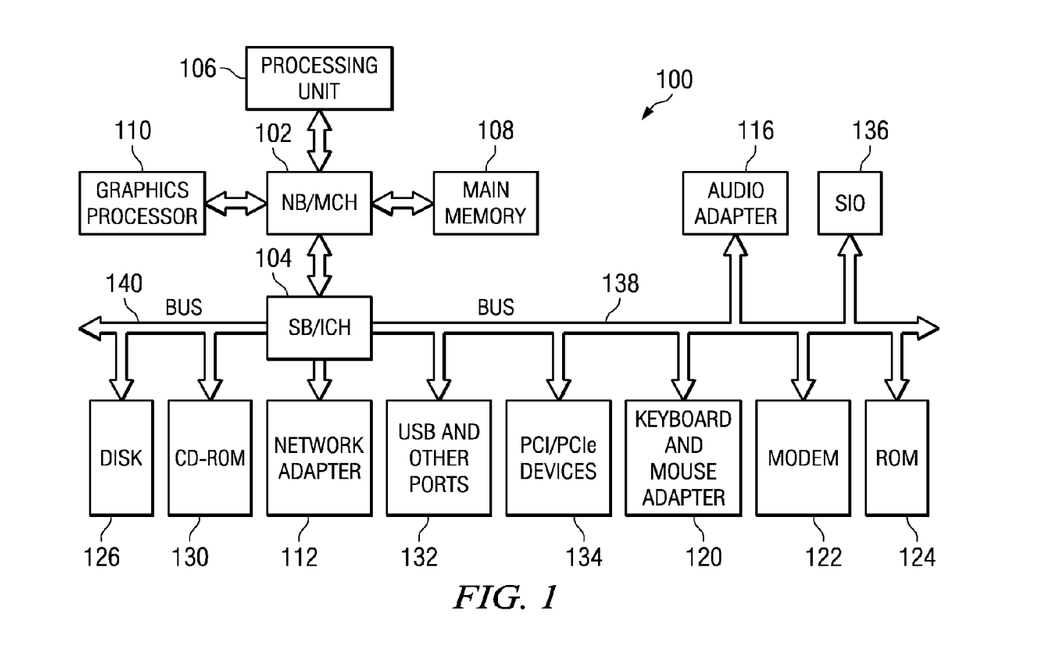
FIG. 1 depicts a block diagram of a data processing system is shown in which aspects of the illustrative embodiments may be implemented.
Figure 2:
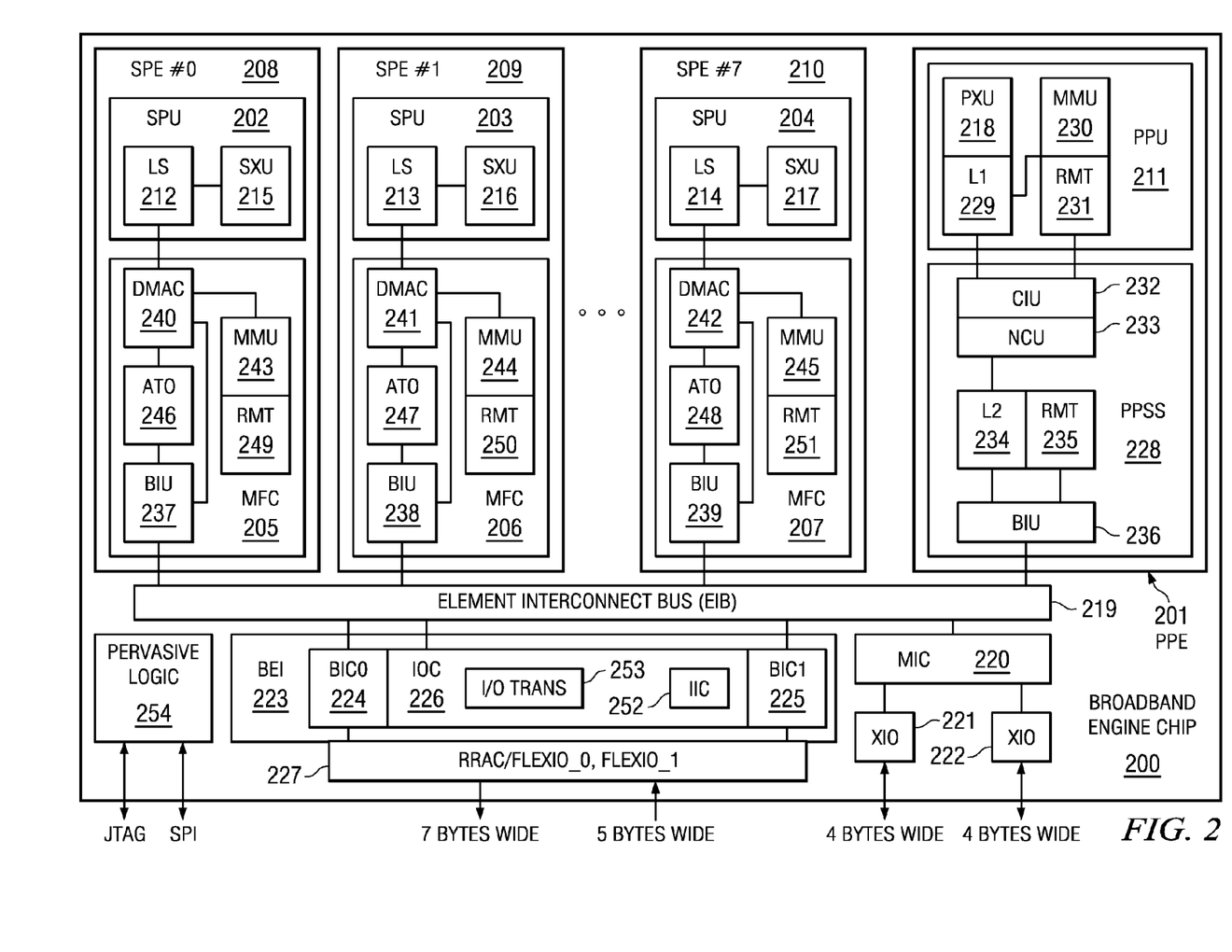
FIG. 2 depicts an exemplary diagram of a Cell Broadband Engine (BE) chip in which aspects of the illustrative embodiments may be implemented.

The illustrative embodiments provide for calibrating digital thermal sensors while consuming as little power as possible. Using as little power as possible during the calibration process may reduce or eliminate the effect of self-heating by the processor due to leakage current. While the illustrative embodiments are optimally used with a Cell Broadband Engine (BE) chip, the described features may be used with other data processing systems. Therefore, FIG. 1 is provided as a description of a general data processing system and FIG. 2 is provided as a description of a Cell BE chip. FIG. 1 is provided as an exemplary data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

FIG. 2 depicts an exemplary diagram of a Cell BE chip in which aspects of the illustrative embodiments may be implemented. Cell BE chip 200 may be a single-chip multiprocessor implementation directed toward distributed processing targeted for media-rich applications such as game consoles, desktop systems, and servers.

Cell BE chip 200 may be logically separated into the following functional components: Power PC® processor element (PPE) 201, synergistic processor units (SPUs) 202, 203, and 204, and memory flow controllers (MFCs) 205, 206, and 207. SPUs 202, 203, and 204, and MFCs 205, 206, and 207 may be within synergistic processor elements (SPEs) 208, 209, and 210. Although synergistic processor elements (SPEs) 208, 209, and 210 and PPE 201 are shown by example, any type of processor element may be supported. Exemplary Cell BE chip 200 implementation may include one PPE 201 and eight SPEs, although FIG. 2 shows only three SPEs 208, 209, and 210. The SPE of a Cell BE chip 200 is a first implementation of a new processor architecture designed to accelerate media and data streaming workloads.

Cell BE chip 200 may be a system-on-a-chip such that each of the elements depicted in FIG. 2 may be provided on a single microprocessor chip. Moreover, Cell BE chip 200 may be a heterogeneous processing environment in which each of SPUs 202, 203, and 204 may receive different instructions from each of the other SPUs in the system. Moreover, the instruction set for SPUs 202, 203, and 204 may be different from that of Power PC® processor unit (PPU) 211, for example, PPU 211 may execute reduced instruction set computer (RISC) based instructions in the Power architecture while SPUs 202, 203, and 204 execute vectorized instructions.

Each SPU 202, 203, or 204 may have a corresponding LS area 212, 213, or 214 and synergistic execution units (SXU) 215, 216, or 217. Each individual SPU 202, 203, or 204 may execute instructions (including data load and store operations) from within its associated LS area 212, 213, or 214. For this reason, dedicated MFCs 205, 206, and 207 may perform all required data transfers to or from storage elsewhere in a system for MFC direct memory access (DMA) operations via SPU's 202, 203, and 204.

A program running on SPU 202, 203, or 204 may reference its own LS area 212, 213, or 214 using a LS address. However, each SPU's LS area 202, 203, or 204 may also be assigned a real address (RA) within the overall system's memory map. The RA may be the address for which a device will respond. In the Power PC®, an application refers to a memory location (or device) by an effective address (EA), which is then mapped into a virtual address (VA) for the memory location (or device) which is then mapped into the RA. The EA may be the address used by an application to reference memory and/or a device. This mapping allows an operating system to allocate more memory than is physically in the system (i.e. the term virtual memory referenced by a VA). A memory map may be a listing of all the devices (including memory) in the system and their corresponding RA. The memory map may be a map of the real address space which identifies the RA for which a device or memory will respond.

Providing such an addressing scheme allows privileged software to map a LS area to the EA of a process to facilitate direct memory access transfers between the LS of one SPU and the LS area of another SPU. PPE 201 may also directly access any SPU's LS area using an EA. In the Power PC® there are three states (problem, privileged, and hypervisor). Privileged software is software that is running in either the privileged or hypervisor states. These states have different access privileges. For example, privileged software may have access to the data structures register for mapping real memory into the EA of an application. Problem state is the state the processor is usually in when running an application and usually is prohibited from accessing system management resources (such as the data structures for mapping real memory).

The MFC DMA data commands may include one LS address and one EA. DMA commands copy memory from one location to another. In this case, an MFC DMA command copies data between an EA and a LS address. The LS address directly addresses LS area 212, 213, or 214 of associated SPU 202, 203, or 204 corresponding to the MFC command queues. Command queues are queues of MFC commands. There may be one queue to hold commands from SPUs 202, 203, and 204 and one queue to hold commands from processor execution unit (PXU) 218 or other devices. However, the EA may be arranged or mapped to access any other memory storage area in the system, including LS areas 212, 213, and 214 of the other SPEs 208, 209, and 210.

Main storage (not shown) may be shared by PPU 211, PPE 201, SPEs 208, 209, and 210, and I/O devices (not shown) in a system, such as the system shown in FIG. 2. All information held in main memory may be visible to all processors and devices in the system. Programs reference main memory using an EA. Since the MFC proxy command queue, control, and status facilities have RAs and the RA may be mapped using an EA, it is possible for a power processor element to initiate DMA operations, using an EA between the main storage and local storage of the associated SPEs 208, 209, and 210.

As an example, when a program running on SPU 202, 203, or 204 needs to access main memory, the SPU program generates and places a DMA command, having an appropriate EA and LS address, into its MFC 205, 206, or 207 command queue. After the command is placed into the queue by the SPU program, MFC 205, 206, or 207 may execute the command and transfer the required data between the LS area and main memory. MFC 205, 206, or 207 provides a second proxy command queue for commands generated by other devices, such as PPE 201. The MFC proxy command queue is typically used to store a program in local storage prior to starting the SPU. MFC proxy commands may also be used for context store operations.

The EA address provides the MFC with an address which may be translated into a RA by a memory management unit (MMU). The translation process allows for virtualization of system memory and access protection of memory and devices in the real address space. Since LS areas are mapped into the real address space, the EA may also address all the SPU LS areas.

Additionally, Cell BE chip 200 may implement element interconnect bus (EIB) 219 and other I/O structures to facilitate on-chip and external data flow. EIB 219 serves as the primary on-chip bus for PPE 201 and SPEs 208, 209, and 210. In addition, EIB 219 may interface to other on-chip interface controllers that are dedicated to off-chip accesses. The on-chip interface controllers may include the memory interface controller (MIC) 220, which provides two extreme data rate I/O (XIO) memory channels 221 and 222, and Cell BE interface unit (BEI) 223, which provides two high-speed external I/O channels and the internal interrupt control for Cell BE 200. BEI 223 may be implemented as bus interface controllers (BICs, labeled BIC0 & BIC1) 224 and 225 and I/O interface controller (IOC) 226. The two high-speed external I/O channels connected to a polarity of Redwood Rambus® Asic Cell (RRAC) interfaces providing the flexible input and output (FlexIO_0 & FlexIO_1) 227 for the Cell BE 200.

PPE 201 on Cell BE chip 200 may include 64-bit PPU 211 and Power PC® storage subsystem (PPSS) 228. PPU 211 may include processor execution unit (PXU) 218, level 1 (L1)

cache 229, MMU 230 and replacement management table (RMT) 231. PPSS 228 may include cacheable interface unit (CIU) 232, non-cacheable unit (NCU) 233, level 2 (L2) cache 234, RMT 235, and bus interface unit (BIU) 236. BIU 236 connects PPSS 228 to EIB 219.

SPU 202, 203, or 204 and MFCs 205, 206, and 207 communicate with each other through unidirectional channels that have capacity. Channels are essentially a FIFO which may be accessed using numerous SPU instructions; read channel (RDCH), write channel (WRCH), and read channel count (RDCHCNT). The RDCHCNT returns the amount of information in the channel. The capacity may be the depth of the FIFO. The channels transport data to and from MFCs 205, 206, and 207, and SPUs 202, 203, and 204. BIUs 237, 238, and 239 connect MFCs 205, 206, and 207 to EIB 219.

MFCs 205, 206, and 207 provide two main functions for SPUs 202, 203, and 204. MFCs 205, 206, and 207 move data between SPUs 202, 203, or 204, LS area 212, 213, or 214, and main memory. Additionally, MFCs 205, 206, and 207 may provide synchronization facilities between SPUs 202, 203, and 204 and other devices in the system.

MFCs 205, 206, and 207 implementation may have four functional units: direct memory access controllers (DMACs) 240, 241, and 242, MMUs 243, 244, and 245, atomic units (ATOs) 246, 247, and 248, RMTs 249, 250, and 251, and BIUs 237, 238, and 239. DMACs 240, 241, and 242 maintain and process MFC command queues (MFC CMDQs) (not shown), which consist of a MFC SPU command queue (MFC SPUQ) and a MFC proxy command queue (MFC PrxyQ). The sixteen-entry, MFC SPUQ handles MFC commands received from the SPU channel interface. The eight-entry, MFC PrxyQ processes MFC commands coming from other devices, such as PPE 201 or SPEs 208, 209, and 210, through memory mapped input and output (MMIO) load and store operations. A typical direct memory access command moves data between LS area 212, 213, or 214 and the main memory. The EA parameter of the MFC DMA command may be used to address the main storage, including main memory, local storage, and all devices having a RA. The local storage parameter of the MFC DMA command may be used to address the associated local storage.

In a virtual mode, MMUs 243, 244, and 245 may provide the address translation and memory protection facilities to handle the EA translation request from DMACs 240, 241, and 242 and send back the translated address. Each SPE's MMU may maintain a segment lookaside buffer (SLB) and a translation lookaside buffer (TLB). The SLB translates an EA to a VA and the TLB translates the VA coming out of the SLB to a RA. The EA may be used by an application and is usually a 32- or 64-bit address. Different applications or multiple copies of an application may use the same EA to reference different storage locations (for example, two copies of an application each using the same EA, will need two different physical memory locations.) To accomplish this, the EA may be first translated into a much larger VA space, which is common for all applications running under the operating system. The EA to VA translation may be performed by the SLB. The VA may then be translated into a RA using the TLB, which is a cache of the page table or the mapping table containing the VA to RA mappings. This table may be maintained by the operating system.

ATOs 246, 247, and 248 provide the level of data caching necessary for maintaining synchronization with other processing units in the system. Atomic direct memory access commands may provide the means for the synergist processor elements to perform synchronization with other units.

The main function of BIUs 237, 238, and 239 may be to provide SPEs 208, 209, and 210 with an interface to EIB 219. EIB 219 may provide a communication path between all of the processor cores on Cell BE chip 200 and the external interface controllers attached to EIB 219.

MIC 220 may provide an interface between EIB 219 and one or two of XTOs 221 and 222. Extreme data rate (XDR™) dynamic random access memory (DRAM) is a high-speed, highly serial memory provided by Rambus®. A macro provided by Rambus may access the extreme data rate dynamic random access memory, referred to in this document as XTOs 221 and 222. MIC 220 may only be a slave on EIB 219. MIC 220 acknowledges commands in its configured address range(s), corresponding to the memory in the supported hubs.

BICs 224 and 225 manage data transfer on and off the chip from EIB 219 to either of two external devices. BICs 224 and 225 may exchange non-coherent traffic with an I/O device, or it can extend EIB 219 to another device, which could even be another Cell BE chip. When used to extend EIB 219, the bus protocol maintains coherency between caches in the Cell BE chip 200 and the caches in the attached external device, which could be another Cell BE chip.

IOC 226 handles commands that originate in an I/O interface device and that are destined for the coherent EIB 219. An I/O interface device may be any device that attaches to an I/O interface such as an I/O bridge chip that attaches multiple I/O devices or another Cell BE chip 200 that is accessed in a non-coherent manner. IOC 226 may also intercept accesses on EIB 219 that are destined to memory-mapped registers that reside in or behind an I/O bridge chip or non-coherent Cell BE chip 200, and routes them to the proper I/O interface. IOC 226 may also include internal interrupt controller (IIC) 252 and I/O address translation unit (I/O Trans) 253.

Pervasive logic 254 may be a controller that provides the clock management, test features, and power-on sequence for the Cell BE chip 200. Pervasive logic may provide the thermal management system for the processor. Pervasive logic contains a connection to other devices in the system through a Joint Test Action Group (JTAG) or Serial Peripheral Interface (SPI) interface, which are commonly known in the art.

Although specific examples of how the different components may be implemented have been provided, this is not meant to limit the architecture in which the aspects of the illustrative embodiments may be used. The aspects of the illustrative embodiments may be used with any multi-core processor system.

During the execution of an application or software, the temperature of areas within the Cell BE chip may rise. Left unchecked, the temperature could rise above the maximal specified junction temperature, leading to improper operation or physical damage. To avoid these conditions, the Cell BE chip's digital thermal management unit monitors and attempts to control the temperature within the Cell BE chip during operation. The digital thermal management unit consists of a thermal management control unit (TMCU) and up to ten distributed digital thermal sensors (DTSs) described herein.

One sensor may be located in each of the eight SPEs, one may be located in the PPE, and one may be adjacent to a linear thermal diode. The linear thermal diode (LTD) is an on-chip diode that enables chip temperature to be determined based on the amount of current flowing through the diode. DTS sensors may be positioned adjacent to areas within the associated unit that typically experience the greatest rise in temperature during the execution of most applications. The thermal control unit monitors feedback from each of DTS sensors. If the temperature of a sensor rises above a programmable threshold, the thermal control unit can be configured to cause an interrupt to the PPE. The PPE will in turn run a program to dynamically throttle the execution of the associated PPE or SPE(s).

Stopping and running the PPE or SPE for a programmable number of cycles provides the necessary throttling. The interrupt allows privileged software to take corrective action while the dynamic throttling attempts to keep the temperature within the broadband engine chip below a programmable level without software intervention. Privileged software sets the throttling level equal to or below recommended settings provided by the application. Each application may be different.

If throttling the PPE or SPEs does not effectively manage the temperature and the temperature continues to rise, pervasive logic 254 stops the Cell BE chip's clocks when the temperature reaches a thermal overload temperature (defined by programmable configuration data). The thermal overload feature protects the Cell BE chip from physical damage. Recovery from this condition requires a hard reset. The temperature of the region monitored by the DTSs is not necessarily the hottest point within the associated PPE or SPE.

Figure 3:
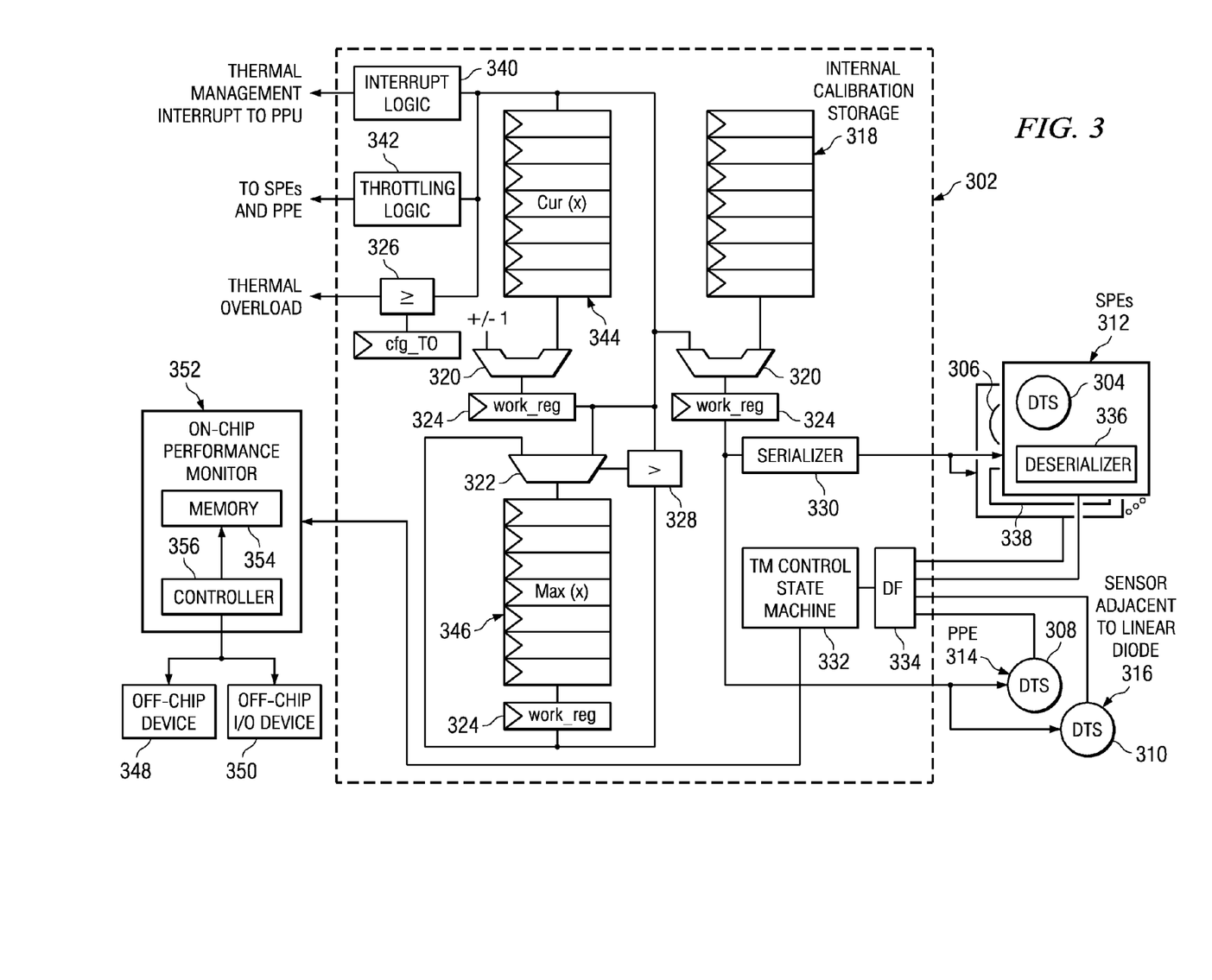
FIG. 3 illustrates an exemplary thermal management system in accordance with an illustrative embodiment.

FIG. 3 illustrates an exemplary thermal management system in accordance with an illustrative embodiment. While the thermal management system is optimally implemented by pervasive logic, such as pervasive logic 254 of FIG. 2, the thermal management system may also be implemented by a processor unit, such as processing unit 106 of FIG. 1. The thermal management system may be implemented as an integrated circuit, such as that provided by pervasive logic unit 254 of FIG. 2 or may be implemented as software, hardware, or a combination of software and hardware. The thermal management system may be an application specific integrated circuit, a processor, a multiprocessor, or a heterogeneous multi-core processor.

As shown in FIG. 3, the thermal management system may be divided between thermal management control unit (TMCU) 302 and ten distributed digital thermal sensors (DTSs), for simplicity only DTSs 304, 306, 308, and 310 are shown. DTSs 304 and 306 may be in SPEs 312, such as SPEs, 208, 209, and 210 of FIG. 2. DTS 308 may be in PPE 314, such as PPE 201 of FIG. 2, and DTS 310 is a digital thermal sensor that may be adjacent to a linear thermal diode 316 (not shown). DTSs 304, 306, 308, and 310 provide a current temperature detection signal. TMCU 302 uses the state of the signals from DTSs 304, 306, 308, and 310 to periodically track the temperature of SPEs 312, PPE 314, and linear diode 316. As the temperature is tracked, TMCU 302 provides the current temperature as a numeric value that represents the temperature detected by DTSs 304, 306, 308, and 310. Each DTS is calibrated during the manufacturing process and individual sensor offset information resides in internal calibration storage 318.

In addition to the elements of TMCU 302 described above, TMCU 302 may also contain multiplexers 320 and 322, work registers 324, comparators 326 and 328, serializer 330, thermal management control state machine 332, and data flow (DF) unit 334. Multiplexers 320 and 322 may combine various incoming signals for transmission over a single medium. Work registers 324 may hold the results of multiplications performed in TMCU 302. Comparators 326 and 328 may provide a comparison function of two inputs. Comparator 326 is shown as a greater than or equal to comparator and comparator 328 is shown as a greater than comparator, while any type of comparator may be used. Serializer 330 may convert low-speed parallel data from a source into high-speed serial data for transmission. Serializer 330 works in conjunction with deserializers 336 and 338 on SPUs 312. Deserializers 336 and 338 may convert received high-speed serial data into low-speed parallel data. Thermal management control state machine 332 starts the internal initialization of TMCU 302. DF unit 334 controls the data to and from thermal management control state machine 332.

TMCU 302 may be configured to cause an interrupt to the PPU within the PPE, using interrupt logic 340, or to dynamically throttle the execution of a PPE or a SPE, using throttling logic 342. TMCU 302 compares the numeric value representing the temperature to a programmable interrupt temperature and a programmable throttle point. Each DTS has an independent programmable interrupt temperature. If the temperature is within the programmed interrupt temperature range, TMCU 302 generates an interrupt to the PPE, if enabled. An interrupt may be generated if the temperature is above or below the programmed level depending on the direction bit, described later. In addition, a second programmable interrupt temperature may cause the assertion of an attention signal to a support processor. The support processor is on the system planer and is connected to the Cell BE on a serial port interface (SPI) port.

If the temperature sensed by the DTS associated with the PPE or SPE is equal to or above the throttling point, TMCU 302 throttles the execution of a PPE or one or more SPEs by starting and stopping that PPE or SPE independently. Software can control the ratio and frequency of the throttling using thermal management registers, such as thermal management stop time registers and thermal management scale registers. If, for any reason, the temperature continues to rise and reaches a temperature at or above a full throttle point, TMCU 302 may stop the PPE or SPE until the temperature drops below the full throttle point. Stopping the PPE or SPEs when the temperature is at or above the full throttle point is referred to as the core stop safety.

TMCU 302 uses thermal sensor status registers that include thermal sensor current temperature status registers 344 and thermal sensor maximum temperature status registers 346. These registers allow software to read the current temperature of each DTS, determine the highest temperature reached during a period of time, and cause an interrupt when the temperature reaches a programmable temperature.

Thermal sensor current temperature status registers 344 contain the encoding or digital value for the current temperature of each DTS. Due to latencies in the sensor's temperature detection, latencies in reading these registers, and normal temperature fluctuations, the temperature reported in these registers is that of an earlier point in time and might not reflect the actual temperature when software receives the data. As each sensor has dedicated control logic, control logic within DTSs 304, 306, 308, and 310 samples all sensors in parallel. TMCU 302 updates the contents of thermal sensor current temperature status registers 344 at the end of the sample period. TMCU 302 changes the value in thermal sensor current temperature status registers 344 to the current temperature. TMCU 302 polls for new current temperatures every predetermined time period. A predetermined time configuration field controls the length of a sample period.

Thermal sensor maximum temperature status registers 346 contain the digitally encoded maximal temperature reached for each sensor from the time thermal sensor maximum temperature status registers 346 were last read. Reading these registers, by software or any off-chip device, such as off-chip device 348 or off-chip I/O device 350, causes TMCU 302 to copy the current temperature for each sensor into thermal sensor maximum temperature status registers 346. After the read, TMCU 302 continues to track the maximal temperature starting from this point. Each thermal sensor maximum temperature status register's 346 read is independent. A read of one of thermal sensor maximum temperature status registers 346 does not effect the contents of the other.

On-chip performance monitor 352 may provide performance monitoring that may trace thermal data provided by temperature sensing devices, such as DTSs 304, 306, 308, and 310. The thermal data may be stored in memory 354 or written to off-chip device 348, such as main memory 108 of FIG. 1, or to an off-chip I/O device 350, such as south bridge and input/output (I/O) controller hub (ICH) 104 of FIG. 1. Controller 356 located in performance monitor 352 controls the determination of where the thermal data is sent.

Therefore, TMCU 302 uses the state of the signals from DTSs 304, 306, 308, and 310 to periodically track the temperature of SPEs 312, PPE 314, and linear diode 316 and control the heat of the data processing system by throttling each of SPEs 312 and PPE 314 individually. Thus, the accuracy of the digital thermal sensors is important to the performance of the data processing. In order to accurately calibrate a digital thermal sensor, the illustrative embodiments provide test logic that is implemented in the analog voltage domain in order to reduce or eliminate the need to enable core voltage supply and possibly encounter self-heating due to the leakage current used by the processor.

Although the following descriptions are directed to one instruction stream and one processor, the instruction stream may be a set of instruction streams, and the processor may be a set of processors. That is, a set may be just a single instruction stream and single processor or two or more instructions streams and processors.

Utilizing the above described architecture, many improvements and added programmability are made for the thermal management and thermal throttling of the Cell BE chip. Some of these improvements and added programmability enable key features while others enhance usability.

Figure 4:
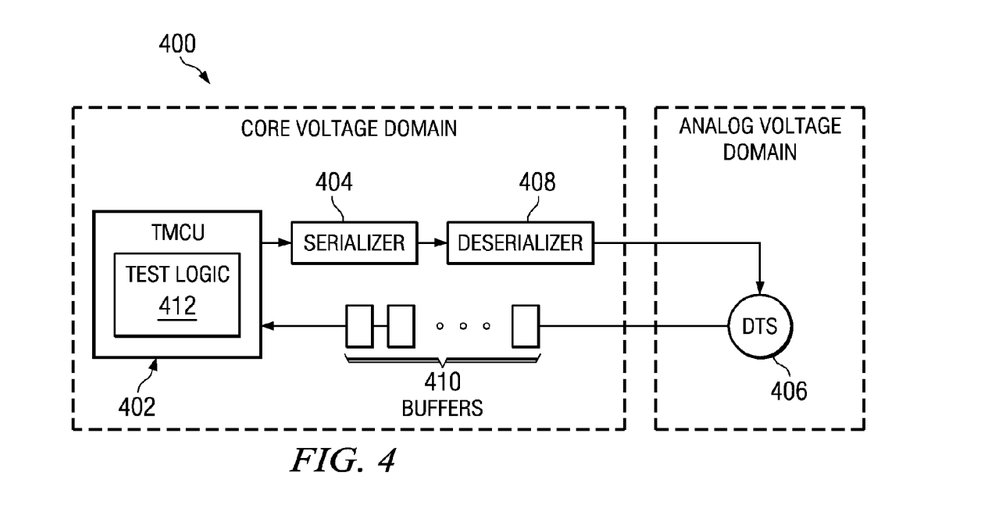
FIG. 4 illustrates a simplified known calibration configuration of a digital thermal sensor.

FIG. 4 illustrates a simplified known calibration configuration of a digital thermal sensor. Configuration 400, thermal management control unit (TMCU) 402, such as TMCU 302 of FIG. 3, uses serializer 404 to convert low-speed parallel data from a source into high-speed serial data for transmission to a digital thermal sensor (DTS), for simplicity only DTS 406 is shown. Serializer 404 works in conjunction with deserializer 408. Deserializer 408 converts received high-speed serial data into low-speed parallel data.

In order to calibrate digital thermal sensor 406, test logic 412 within TMCU 402 uses a core voltage supply to power TMCU 402 and analog voltage to power DTS 406. Enabling the core voltage supply enables power to the processor chip, such as Cell BE chip 200 of FIG. 2, on which the pervasive logic that includes TMCU 402 resides. Enabling core voltage supply causes the processor chip to consume a significant amount of power due to leakage current and, in turn, the self-heating elevates the internal processor temperature. Test logic 412 sends calibration information via serializer 404 and deserializer 408 to DTS 406. The data from deserializer 408 may cause the output of DTS 406 to transition from zero to one when the calibration data meets or exceeds the test temperature. Buffers 410 buffer the output of the DTS 406 and return the output to test logic 412. Test logic 412 monitors the transition of the low to high transition of DTS 406 to determine the temperature detected. However, the temperature value observed may be inaccurate due to the self-heating of the processor chip. The self-heating variable makes the calibration process more difficult and also less accurate.

Figure 5:
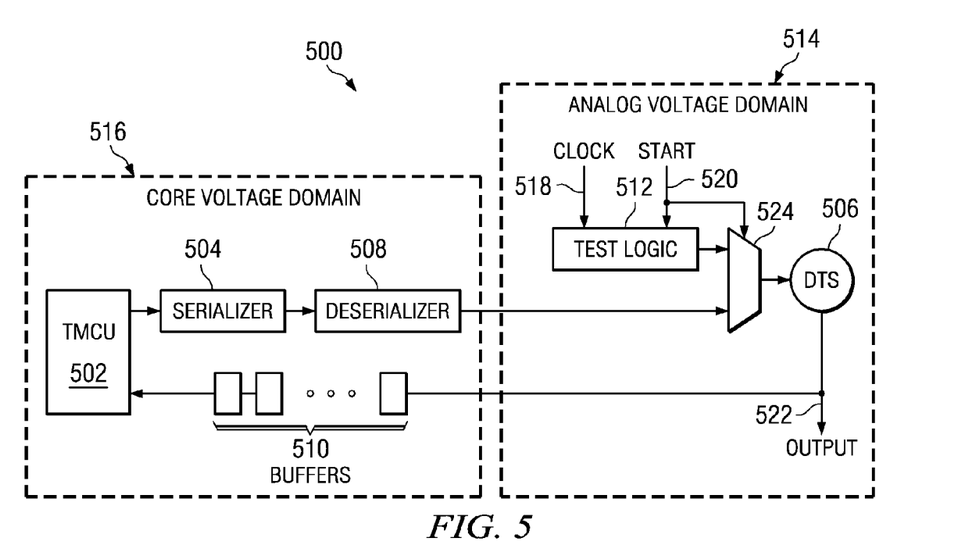
FIG. 5 illustrates an improved calibration configuration of a digital thermal sensor in accordance with an illustrative embodiment.

FIG. 5 illustrates an improved calibration configuration of a digital thermal sensor in accordance with an illustrative embodiment. By moving the test logic to the analog voltage domain, the possibility of encountering self-heating due to the leakage current used by enabling the core voltage supply, the processor is reduced or eliminated.

As shown in FIG. 5, configuration 500 includes thermal management control unit (TMCU) 502, such as TMCU 302 of FIG. 3, serializer 504, DTS 506, and deserializer 508. Buffers 510 may ensure timing is met for DTS 506 output signal returning back to TMCU 502. However, in an improved calibration configuration, TMCU 502, serializer 504, deserializer 508, and buffers 510 are used for thermal interrupt and thermal throttling and not as part of the calibration process.

In order to calibrate DTS 506 without the effect of self-heating of the processor due to leakage current, test logic 512 moves to the analog voltage domain 514, thereby eliminating the need to enable the core voltage domain 516. Test logic 512 uses two input signals, clock signal 518 and start signal 520, and provides output 522. Test logic 512 uses clock signal 518 to coordinate the actions of test logic 512. Start signal 520 is used to select between test logic 512 for test mode or deserializer 508 for functional mode. The detailed operation of the test logic 512 will be described in FIG. 6. Test logic 512 generates data that is multiplexed by multiplexer 524 along with start signal 520 to initiate calibration of DTS 506. DTS 506 uses the output of multiplexer 524 to move the temperature sensing threshold. DTS 506 outputs a digital value to output 522 when the temperature threshold is equal to or greater than the ambient temperature. The manufacturing tester monitors the output from DTS 506 during testing and TMCU 502 tester monitors the output from DTS 506 during functional mode.

Figure 6:
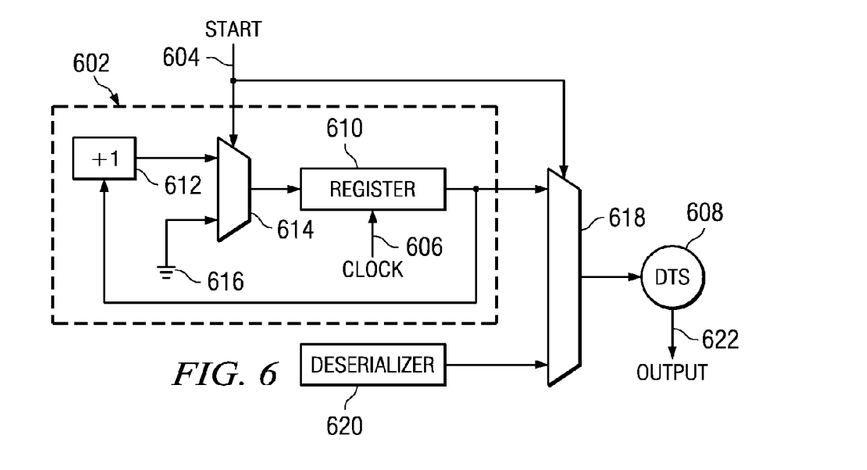
FIG. 6 illustrates the operation of calibration test logic in accordance with an illustrative embodiment.

FIG. 6 illustrates the operation of calibration test logic in accordance with an illustrative embodiment. Calibration test logic 602, such as test logic 512 of FIG. 5, uses start signal 604 and clock signal 606 as inputs for the calibration of digital thermal sensor (DTS) 608. Calibration test logic 602 uses start signal 604 to start the calibration process and reset calibration test logic 602. Calibration test logic 602 uses clock signal 606 to coordinate the actions of calibration test logic 602. In order to perform an accurate calibration, register 610 starts with an initial value of zero. Register 610 may be reset to zero by holding start signal 604 in a first state, such as low, high, or the like, for a number of clock cycles such that register 610 is cleared. FIG. 6 is based on the assumption that the first state is the low state for start signal 604. To clear register 610, multiplexer 614 selects ground signal 616 and shifts zeros into register 610 for a number of clock cycles such that register 610 is cleared. Transitioning start signal 604 to a second state, such as low, high, or the like, and multiplexer 614 selects incrementer 612 that increments the current value in register 610 by a value of 1 on every clock cycle using clock signal 606.

Calibration test logic 602 also uses start signal 604 to select between register 610, output path for test mode, or deserializer 620, output path for functional mode. When start signal 604 is in the first state, multiplexer 618 selects the output of deserializer 620 as input to DTS 608. When starts signal 604 transitions to the second state, multiplexer 618 selects the output value of register 610 as input to DTS 608. DTS 608 uses the output of multiplexer 618 as the temperature threshold. DTS 608 outputs a logic value of one when the temperature threshold is equal to or greater than the ambient temperature to output 622 that is sent to the manufacturing tester during testing and sent to the TMCU during functional mode. Start signal 604, clock signal 606, and output 622 may be connections, such as controlled collapse chip connections (C4s), that are available for the tester to connect to during manufacturing test.

For example, to calibrate a DTS the manufacturing test fixture would be preheated to the desired calibration temperature, for example 85° C. The processor chip with DTS 608 would be placed in the test fixture and allowed to heat up to the test fixture temperature. After the processor reaches the fixture temperature, the manufacturing tester connects start signal 604, clock signal 606, and output 622 and applies analog power to the processor. The manufacturing tester places start signal 604 in the first state, such as low, high, or the like, long enough to clear register 610. Clock signal 606 would be toggled to allow register 610 to clear. If register 610 was 8-bits, 256 clock cycles would be needed to ensure that the register was cleared.

Once the register has been cleared to zero, start signal 604 transitions from the first state to a second state, such as from a logic zero to a logic one state, from a logic one to a logic zero state, or the like. Incrementer 612, within test logic 602, then increments the value of register 610 by a value, such as one, on each clock cycle. Register 610 sends its output through the multiplexer 618 to the input of the DTS 608. When the input to DTS 608 reaches the temperature threshold that corresponds to the temperature of the test fixture, the output 622 transitions. The test program monitors output 622 of DTS 608 for a transition, such as from zero to one, from one to zero, or the like. The point of the transition will indicate the temperature that DTS 608 is measuring or the activation temperature. To calibrate DTS 608, if the activation temperature is greater than or less than the manufacturing test fixture temperature, the manufacturing tester uses the difference or delta (Δ) to calculate the thermal offset that is stored in the internal calibration storage, such as internal calibration storage 318 shown in FIG. 3. The TMCU then uses the thermal offset for monitoring the temperature sensed by DTS 608.

Thus, moving the test logic to the analog voltage domain reduces or eliminates the possibility of encountering self-heating due to the leakage current used by enabling the core voltage supply of the processor. Placing the test logic in the analog domain also eliminates the need to enable the clock grid for the entire processor chip. Clocking the entire chip would cause additional heating from the clock grid buffers and distribution circuits.

Figure 7:
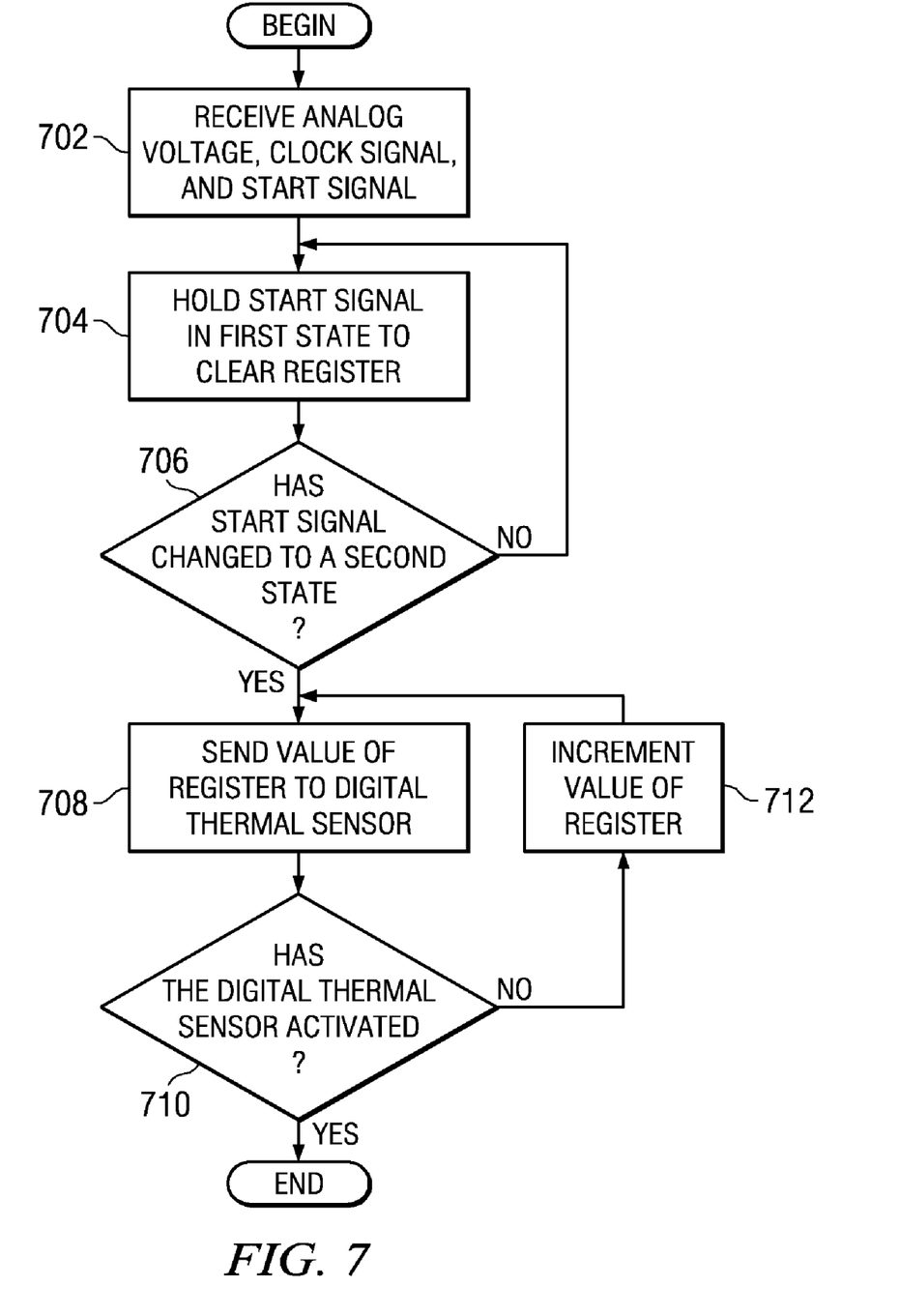
FIG. 7 depicts a flowchart of the operation performed by test logic in calibrating a digital thermal sensor (DTS) in accordance with an illustrative embodiment.

FIG. 7 depicts an exemplary flowchart of the operation performed by test logic in calibrating a digital thermal sensor (DTS) in accordance with an illustrative embodiment. The operation described in FIG. 7 is performed by test logic and a DTS, such as test logic 602 and DTS 608 of FIG. 6, respectively. As the operation begins the test logic receives an analog voltage, clock signal and a start signal (step 702). The manufacturing tester places the start signal in a first state and zeros are sent to the register for a number of clock cycles so that the register will be cleared (step 704). After each clock cycle, the test logic determines whether the start signal has changed to a second state (step 706). If at step 706 the start signal has not changed to the second state, the operation returns to step 704. If at step 706 the start signal has changed to the second state, the test logic outputs the value of the register to the DTS (step 708).

The test logic determines on each clock cycle as to whether the DTS's thermal threshold has been activated (step 710). The DTS will indicate the point of the thermal threshold activation by transitioning the output signal from a zero logic level to one logic level. If at step 710, the DTS has not activated the output signal to a logic one, an incrementer in the test logic increments the value of the register by a value on each clock cycle (step 712), with the operation returning to step 708 thereafter. If at step 710, the DTS has activated and output a logic one, the test logic uses the register value sent to the DTS on the last clock cycle as the value that met the thermal activation threshold temperature. The test logic then uses the value in the calculation of the thermal offset that is stored in the internal calibration storage in the TMCU. When the DTS outputs a logic one, the operation ends thereafter.

Thus, the illustrative embodiments provide for test logic in the analog voltage domain in order to reduce or eliminate the need to enable core voltage supply and possibly encounter self-heating due to the leakage current used by the processor. Moving the test logic to the analog voltage domain provides advantages, such as eliminates the effect of self-heating during calibration, does not require the system to go through a power-on reset sequence to set up the core logic, provides a simpler test/calibration sequence, and requires less logic and a smaller footprint. In short, the illustrative embodiments improve calibration accuracy, reduce test time, reduce calibration complexity, and reduce area.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for calibrating digital thermal sensors in an analog voltage domain, the method comprising:
   powering test logic and a plurality of digital thermal sensors, in a processor chip, with an analog voltage and without enabling a core voltage to any remaining components in the processor chip in order to eliminate any effect of self-heating due to leakage current in the remaining components of the processor chip;
   receiving, in the test logic, a clock signal;
   outputting a value of a register, on each clock cycle from the clock signal, to each digital thermal sensor in the plurality of digital thermal sensors; and
   for each digital thermal sensor in the plurality of digital thermal sensors:
      responsive to the value of the register received in the digital thermal sensor failing to equal the temperature threshold of the digital thermal sensor, incrementing the value of the register on each clock cycle from the clock signal, wherein the value of the register is incremented by one on each clock cycle by an incrementer; and
      responsive to the value of the register received in the digital thermal sensor equaling a temperature threshold of the digital thermal sensor, transitioning an output state of the digital thermal sensor, wherein the value of the register at the point of transition is used to calibrate the digital thermal sensor.

2. The method of claim 1, wherein incrementing the value of the register on each clock cycle from the clock signal is performed in response to receiving a start signal indicating a second state.

3. The method of claim 1, further comprising:
   receiving a start signal indicating a first state that initiates a test mode; and
   responsive to receiving the start signal indicating the first state, holding the start signal in the first state for a predetermined number of clock cycles so that the value of the register sets to zero, wherein the predetermined number of clock cycles is determined by a size of the register.

4. The method of claim 1, wherein a delta value that indicates the calibration value of the digital thermal sensor is stored in a data structure in a thermal management control unit.

5. The method of claim 4, wherein the delta value indicates a difference between the value of the register at the point of transition and a manufacturer's test fixture temperature.

6. The method of claim 4, wherein the delta value is used to calibrate the temperatures sensed by the digital thermal sensor in a functional mode.

7. The method of claim 4, wherein the processor chip is placed in a manufacturer's test fixture and is given time to stabilize to a test temperature of the manufacturer's test fixture.

8. The method of claim 1, wherein the digital thermal sensor is set to an initial thermal threshold.

9. A digital thermal sensor calibration apparatus in an analog voltage domain, the apparatus comprising:
   test circuit and a plurality of digital thermal sensors in a processor chip that are powered by an analog voltage without enabling a core voltage to any remaining components in the processor chip in order to eliminate any effect of self-heating due to leakage current in the remaining components of the processor chip, wherein the test circuit receives a clock signal;
   a register coupled to the test circuit outputs a value on each clock cycle from the clock signal to each digital thermal sensor in the plurality of digital thermal sensors; and
   for each digital thermal sensor in the plurality of digital thermal sensors:
      an incrementer increments the value of the register on each clock cycle from the clock signal in response to the value of the register received in the digital thermal sensor failing to equal the temperature threshold of the digital thermal sensor, wherein the value of the register is incremented by one on each clock cycle; and
      the digital thermal sensor transitions an output state in response to the value of the register received in the digital thermal sensor equaling a temperature threshold of the digital thermal sensor, wherein the value of the register at the point of transition is used to calibrate the digital thermal sensor.

10. The apparatus of claim 9, wherein incrementing the value of the register on each clock cycle from the clock signal is performed in response to receiving a start signal indicating a second state.

11. The apparatus of claim 9, wherein the test circuit receives a start signal that indicates a first state that initiates a test mode and wherein the value of the register sets to zero in response to the start signal being held in the first state for a predetermined number of clock cycles, wherein the predetermined number of clock cycles is determined by a size of the register.

12. The apparatus of claim 9, wherein a delta value that indicates the calibration value of the digital thermal sensor is stored in a data structure in a thermal management control unit.

13. The apparatus of claim 12, wherein the delta value indicates a difference between the value of the register at the point of transition and a manufacturer's test fixture temperature.

14. The apparatus of claim 12, wherein the delta value is used to calibrate the temperatures sensed by the digital thermal sensor in a functional mode.

15. The apparatus of claim 9, wherein the processor chip is placed in a manufacturer's test fixture and is given time to stabilize to a test temperature of the manufacturer's test fixture.

16. The apparatus of claim 9, wherein the digital thermal sensor is set to an initial thermal threshold.

17. A computer program product comprising a non-transitory computer readable medium having a computer readable program for calibrating digital thermal sensors in an analog voltage domain, wherein the computer readable program, when executed in a data processing system, causes the data processing system to:

receive and power test logic and a plurality of digital thermal sensors, in a processor chip, with an analog voltage and without enabling a core voltage to any remaining components in the processor chip in order to eliminate any effect of self-heating due to leakage current in the remaining components of the processor chip;

receive a clock signal;

output a value of a register on each clock cycle from the clock signal to each digital thermal sensor in the plurality of digital thermal sensors; and for each digital thermal sensor in the plurality of digital thermal sensors:

responsive to the value of the register received in the digital thermal sensor failing to equal the temperature threshold of the digital thermal sensor, increment the value of the register on each clock cycle from the clock signal, wherein the value of the register is incremented by one on each clock cycle by an incrementer; and responsive to the value of the register received in the digital thermal sensor equaling a temperature threshold of the digital thermal sensor, transition an output state of the digital thermal sensor, wherein the value of the register at the point of transition is used to calibrate the digital thermal sensor.

18. The computer program product of claim 17, wherein incrementing the value of the register on each clock cycle from the clock signal is performed in response to receiving a start signal indicating a second state.

19. The computer program product of claim 17, wherein the computer readable program further causes the data processing system to:

receive a start signal indicating a first state that initiates a test mode; and responsive to receiving the start signal indicating the first state, hold the start signal in the first state for a predetermined number of clock cycles so that the value of the register sets to zero, wherein the predetermined number of clock cycles is determined by a size of the register.

20. The computer program product of claim 17, wherein a delta value that indicates the calibration value of the digital thermal sensor is stored in a data structure in a thermal management control unit, wherein the delta value indicates a difference between the value of the register at the point of transition and a manufacturer's test fixture temperature, and wherein the delta value is used to calibrate the temperatures sensed by the digital thermal sensor in a functional mode.

21. The computer program product of claim 17, wherein the processor chip is placed in a manufacturer's test fixture and is given time to stabilize to a test temperature of the manufacturer's test fixture, and wherein the digital thermal sensor is set to an initial thermal threshold.

\* \* \* \* \*